US012780657B2

(12) United States Patent
Mortensen

(10) Patent No.: US 12,780,657 B2
(45) Date of Patent: Nov. 3, 2026

(54) PROCESS CONTROL OF A SERIAL REFORMER SECTION BY ELECTRICAL REFORMING

(71) Applicant: TOPSOE A/S, Kgs. Lyngby (DK)

(72) Inventor: Peter Mølgaard Mortensen, Roskilde (DK)

(73) Assignee: TOPSOE A/S, Kgs. Lyngby (DK)

( * ) Notice: Subject to any disclaimer, the term of this patent is extended or adjusted under 35 U.S.C. 154(b) by 115 days.

(21) Appl. No.: 18/041,814

(22) PCT Filed: Sep. 1, 2021

(86) PCT No.: PCT/EP2021/074168

§ 371 (c)(1),
(2) Date: Feb. 16, 2023

(87) PCT Pub. No.: WO2022/049148

PCT Pub. Date: Mar. 10, 2022

(65) Prior Publication Data

US 2023/0312340 A1 Oct. 5, 2023

(30) Foreign Application Priority Data

Sep. 2, 2020 (EP) .................................... 20194090

(51) Int. Cl.
*C01B 3/382* (2026.01)

(52) U.S. Cl.
CPC ...... *C01B 3/382* (2013.01); *C01B 2203/0233* (2013.01); *C01B 2203/0833* (2013.01);
(Continued)

(58) Field of Classification Search
CPC ...................... C01B 3/26; C01B 3/382; C01B 2203/0233; C01B 2203/0844; C01B 2203/085;
(Continued)

(56) References Cited

U.S. PATENT DOCUMENTS 5,006,131 A 4/1991 Karafian et al.
2003/0176953 A1* 9/2003 Husted ............... G05D 23/2401 429/495
2016/0236183 A1* 8/2016 Fonseca Bidart ........ B01J 21/04
2016/0289072 A1* 10/2016 Adams, II ............... C01B 3/384

FOREIGN PATENT DOCUMENTS

DE 102008050817 A1 4/2010
EP 0437059 A2 7/1991
(Continued)

OTHER PUBLICATIONS

English machine translation of FR 2897052 (Year: 2007).*
(Continued)

*Primary Examiner* — Renee Robinson
(74) *Attorney, Agent, or Firm* — Boone IP Law

(57) ABSTRACT

A plant is provided which comprises a reforming section, a gas separation section and a hydrocarbon-containing feed. The reforming section includes a heat exchange reformer and an electrical steam methane reformer (e-SMR) arranged downstream of said heat exchange reformer. The gas separation section is arranged to receive a synthesis gas stream from the reforming section and separate it into at least a condensate and a product gas. The plant is controlled by feedback control on the e-SMR.

9 Claims, 2 Drawing Sheets

(52) U.S. Cl.
CPC ................ *C01B 2203/0844* (2013.01); *C01B 2203/085* (2013.01); *C01B 2203/0866* (2013.01); *C01B 2203/1235* (2013.01); *C01B 2203/142* (2013.01); *C01B 2203/146* (2013.01); *C01B 2203/148* (2013.01); *C01B 2203/1614* (2013.01)

(58) Field of Classification Search
CPC ...... C01B 2203/0866; C01B 2203/142; C01B 2203/1614
See application file for complete search history.

(56) References Cited

FOREIGN PATENT DOCUMENTS

| | | | |
|---|---|---|---|
| EP | 3574991 | A1 | 12/2019 |
| FR | 2897052 | A1 | 8/2007 |
| JP | 2003002601 | A | 1/2003 |
| WO | 2019228796 | A1 | 12/2019 |

OTHER PUBLICATIONS

APPL, “Ammonia, 3. Production Plants”, Ullmann’s Encyclopedia of Industrial Chemistry, Oct. 15, 2011, pp. 227-261, vol. 3, Wiley-VCH Verlag, Weinheim, Germany.
De Klerk, “Fischer-Tropsch Process”, Kirk-Othmer Encyclopedia of Chemical Technology, Jan. 18, 2013, 36 pages.
English et al., “Methanol”, Kirk-Othmer Encyclopedia of Chemical Technology, Mar. 16, 2015, 19 pages.
International Search Report (PCT/ISA/210) and Written Opinion (PCT/ISA/237) mailed on Nov. 16, 2021, by the European Patent Office as the International Searching Authority for International Application No. PCT/EP2021/074168.
Search Report mailed on Mar. 3, 2021, by the European Patent Office for Application No. EP 20194090.5, 10 pages.
Wismann et al., “Electrified methane reforming: A compact approach to greener industrial hydrogen production”, Science, May 24, 2019, pp. 756-759, vol. 364, No. 6442.
Office Action (with English translation) issued by the Ministry of Intellectual Property on Jul. 8, 2026, in related Korean 1 Application No. 10-2023-7007199, 18 pages.

* cited by examiner

PROCESS CONTROL OF A SERIAL REFORMER SECTION BY ELECTRICAL REFORMING

TECHNICAL FIELD

A process and a plant are described for boosting the feedstock conversion in a reforming plant and to control the product quality, by using an electrical steam methane reformer (e-SMR) in a subsequent reforming step.

BACKGROUND

One challenge of convective reformers—in particular convective bayonet reformers—is that their maximum operating temperature is often confined due to the requirement for a driving force for energy transfer between the convective medium and the heated zone. Still, convective reformers are attractive as they offer a route for better energy utilization in chemical plants by utilizing hot process gas as energy source for the reforming reaction.

This—in turn—constrains the operation of the equipment, as the ultimate control of the product quality (i.e. reforming temperature) must be done by controlling either the feed or convective process (hot gas for energy transfer).

The standard solution for a bayonet convective reformer includes a built-in product control mechanism on a feed line. The product quality is done on feed to the reforming section.

SUMMARY

A plant is provided which comprises a reforming section (A), a gas separation section (B) and a hydrocarbon-containing feed, wherein said reforming section (A) is arranged to receive said hydrocarbon-containing feed and provide a synthesis gas stream, wherein said reforming section (A) comprises a heat exchange reformer and an electrical steam methane reformer, e-SMR, arranged downstream of said heat exchange reformer;

said heat exchange reformer comprising a housing and one or more reactor tubes arranged within said housing, wherein one or more first catalyst bed(s) are arranged inside said heat exchange reformer, said catalyst bed(s) being arranged to be heated by a heating fluid, wherein said one or more first catalyst bed(s) are arranged to receive a first portion of the hydrocarbon-containing feed and convert said first portion of the hydrocarbon-containing feed to a first synthesis gas stream; said e-SMR housing a second catalyst and being arranged to receive at least a portion of the first synthesis gas stream from said heat exchange reformer and convert it to a second synthesis gas stream;

wherein the plant comprises a control system arranged to control the electrical power supply to ensure that the temperature of the gas exiting the e-SMR lies in a predetermined range;

wherein the gas separation section (B) is arranged to receive a synthesis gas stream from said reforming section (A) and separate it into at least a condensate and a product gas, wherein at least a part of the second synthesis gas stream (21) is arranged to be provided to the heat exchange reformer as at least a part of said heating fluid.

Also provided is a process for providing a product gas from a hydrocarbon-containing feed in a plant according to the invention. Further details of the invention are provided in the following description, figures and dependent claims.

LEGENDS TO THE FIGURES

DETAILED DISCLOSURE

Figure 1:
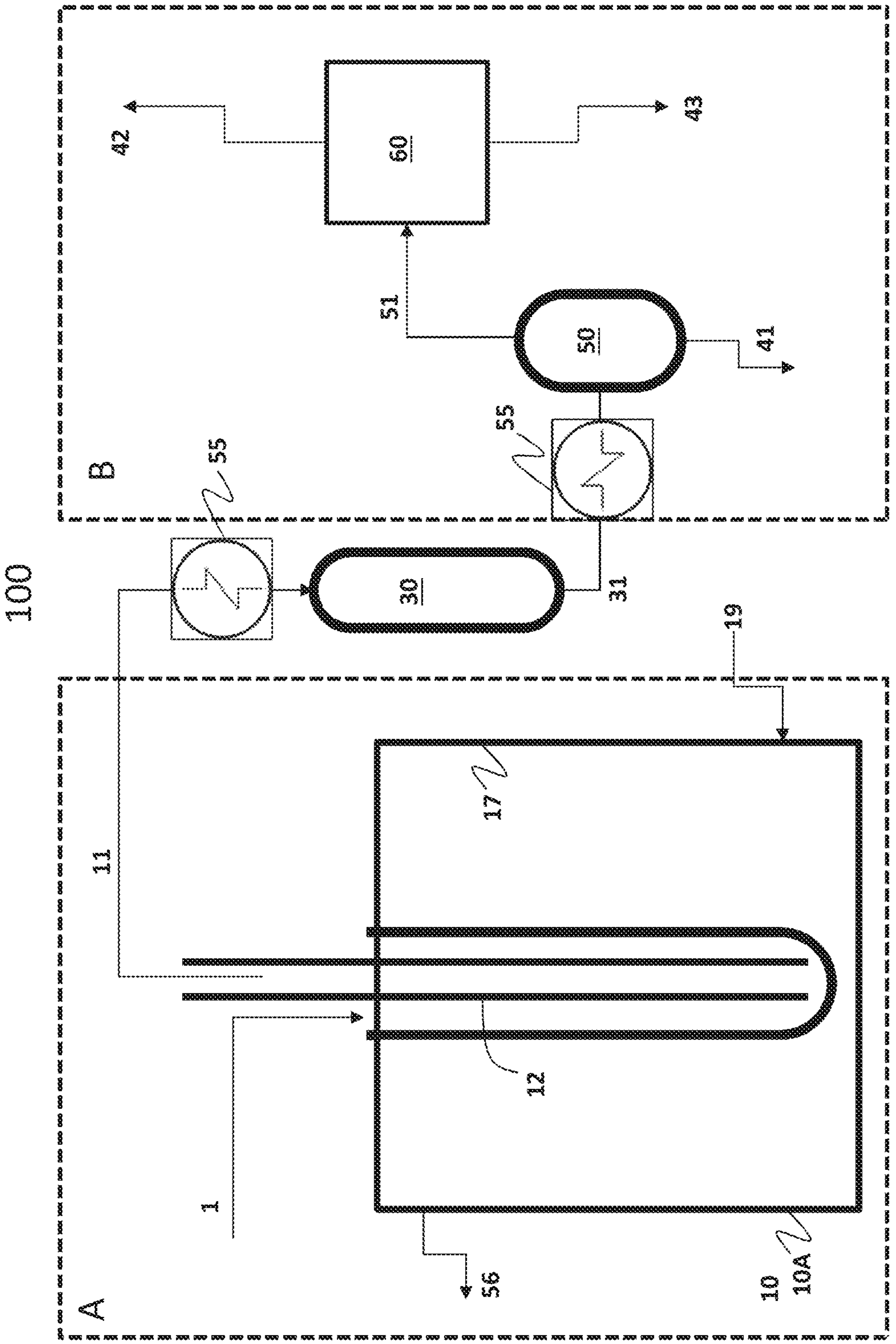
FIG. 1 shows a schematic plant layout, without an e-SMR

The present invention describes a process and a plant for boosting the feedstock conversion in a reforming plant and to control the product quality, by using an electrical steam methane reformer (e-SMR) in a subsequent reforming step.

Using a heat exchange reformer together with an electrical reformer in series gives a synergy, because the process control of the product quality is moved from the fired reactor to the electrically heated reactor.

Specifically, using a convective bayonet reformer together with an electrical reformer gives a synergy, because the convective reformer operates in a mode where a maximum increase in chemical energy is achieved while still operating at a relatively low outlet temperature, which makes it possible to combine directly with an e-SMR in which limitations are placed on e-SMR inlet temperatures due to electrical connections in this apparatus. In general, when the chemical energy of the process gas is increased in the upstream convective reformer, the electrical energy use of the e-SMR is decreased. The combination of these reformers in series therefore gives lower operating costs than e.g. a stand-alone e-SMR.

The configuration allows for better feedstock utilization, and improved energy recovery.

The term product quality is meant to denote a quantitative process for determining the conversion of the reactant to the desired product in the chemical reactor. For the endothermic steam reforming reaction, a good way to follow this is by the equilibrium temperature. The equilibrium temperature of the steam reforming reaction is found by initially calculating the reaction quotient (Q) of the given gas as:

$$Q = \frac{y_{CO} \cdot y_{H_2}^3}{y_{CH_4} \cdot y_{H_2O}} \cdot P^2$$

Here $y_j$ is the molar fraction of compound j, and P is the total pressure in bar. This is used to determine the equilibrium temperature ($T_{eq}$) at which the given reaction quotient is equal to the equilibrium constant:

$$Q = K_{SMR}(T_{eq})$$

where $K_{SMR}$ is the thermodynamic equilibrium constant of the steam methane reforming reaction. The approach to equilibrium of the steam methane reforming ($\Delta T_{app,SMR}$) reaction is then defined as:

$$\Delta T_{app,SMR} = T - T_{eq}$$

Where T is the bulk temperature of the gas surrounding the catalyst material used. Classically, large scale industrial SMRs have been designed to obtain an approach to equilibrium of 5-20° C. at the outlet thereof.

In an embodiment, the desired product quality of e.g. the second synthesis gas stream would have a steam methane reforming equilibrium temperature of 850° C., more preferably 950° C., and even more preferably 1050° C., with an accompanied approach to equilibrium of below 50° C., more preferably below 25° C. and even more preferably below 10° C.

In the following, all percentages are given as volume %, unless otherwise specified. The term "substantially pure" should be understood as meaning more than 80% pure, ideally more than 90%, such as more than 99% pure.

The term "steam reforming" or "steam methane reforming reaction" is meant to denote a reforming reaction according to one or more of the following reactions:

$$CH_4+H_2O \leftrightarrow CO+3H_2 \quad (i)$$

$$CH_4+2H_2O \leftrightarrow CO_2+4H_2 \quad (ii)$$

$$CH_4+CO_2 \leftrightarrow 2CO+2H_2 \quad (iii)$$

Reactions (i) and (ii) are steam methane reforming reactions, whilst reaction (iii) is the dry methane reforming reaction.

For higher hydrocarbons, viz. $C_nH_m$, where n≥2, m≥4, equation (i) is generalized as:

$$C_nH_m+nH_2O \leftrightarrow nCO+(n+m/2)H_2 \quad (iv)$$

where n≥2, m≥4.

Typically, steam reforming is accompanied by the water gas shift reaction (v):

$$CO+H_2O \leftrightarrow CO_2+H_2 \quad (v)$$

The terms "steam methane reforming" and "steam methane reforming reaction" are meant to cover the reactions (i) and (ii), the term "steam reforming" is meant to cover the reactions (i), (ii) and (iv), whilst the term "methanation" covers the reverse reaction of reaction (i). In most cases, all of these reactions (i)-(v) are at, or close to, equilibrium at the outlet from the reforming reactor.

The plant—illustrated schematically in the enclosed figures—comprises a reforming section (A), a gas separation section (B) and a hydrocarbon-containing feed.

The reforming section (A) is arranged to receive the hydrocarbon-containing feed and provide a synthesis gas stream. In general terms, the reforming section (A) comprises a heat exchange reformer and an electrical steam methane reformer, (e-SMR) arranged downstream of the heat exchange reformer. These components are described in more detail in the following.

Hydrocarbon-Containing Feed

A hydrocarbon-containing feed is supplied to the plant; at least to the reforming section (A) thereof. In this context, the term "hydrocarbon-containing feed" is meant to denote a gas with one or more hydrocarbons and possibly other constituents. Thus, a hydrocarbon-containing feed typically comprises a hydrocarbon gas, such as $CH_4$ and optionally also higher hydrocarbons often in relatively small amounts, in addition to small amounts of other gasses. Higher hydrocarbons are components with two or more carbon atoms such as ethane and propane. Examples of "hydrocarbon-containing feed" may be natural gas, town gas, naphtha or a mixture of methane and higher hydrocarbons, biogas or LPG. Hydrocarbons may also be components with other atoms than carbon and hydrogen such as oxygen or sulphur.

The hydrocarbon-containing feed may additionally comprise—or be mixed with one more co-reactant feeds—steam, hydrogen and possibly other constituents, such as carbon monoxide, carbon dioxide, nitrogen and argon. Typically, the hydrocarbon-containing feed has a predetermined ratio of hydrocarbon, steam and hydrogen, and potentially also carbon dioxide. The hydrocarbon feed will—in most practical applications—contain steam.

In one aspect, the hydrocarbon-containing feed comprises a gas mixture with a biogas feed. Biogas is a mixture of gases produced by the breakdown of organic matter in the absence of oxygen. Biogas can be produced from raw materials such as agricultural waste, manure, municipal waste, plant material, sewage, green waste or food waste. Biogas is primarily methane ($CH_4$) and carbon dioxide ($CO_2$) and may have small amounts of hydrogen sulfide ($H_2S$), moisture, siloxanes, and possibly other components. Up to 30% or even 50% of the biogas may be carbon dioxide.

The hydrocarbon-containing feed may have gone through at least steam addition (present as a co-reactant feed) and optionally also pretreatment (described in more detail in the following).

In an embodiment, the hydrocarbon-containing feed is a mixture of $CH_4$, CO, $CO_2$, $H_2$, and, $H_2O$, where the concentration of $CH_4$ is 5-50 mole %, the concentration of CO is 0.01-5%, the concentration of $CO_2$ is 0.1 to 50%, the concentration of $H_2$ is 1-10%, and the concentration of $H_2O$ is 30-70%.

Heat Exchange Reformer

The reforming section (A) comprises a heat exchange reformer. The term "heat exchange reformer" is meant to denote a reforming reactor wherein heat is supplied for the steam methane reforming reaction by heat exchange with a heating fluid. The heat exchange reformer is—in a preferred instance—a heat exchange bayonet reformer.

The heat exchange reformer comprises a housing and one or more reactor tubes arranged within said housing. Typically, a heat exchange reformer comprises a large number, e.g. more than 50, more than 100, or more than 500 reactor tubes.

One or more first catalyst bed(s) are arranged inside said heat exchange reformer, the catalyst bed(s) are arranged to be heated by a heating fluid.

The one or more first catalyst bed(s) are arranged to receive a first portion of the hydrocarbon-containing feed and convert said first portion of the hydrocarbon-containing feed to a first synthesis gas stream. As such, the first catalyst beds may comprise any catalyst suitable for catalysing the steam reforming reaction.

In one aspect, the one or more first catalyst bed(s) are arranged inside said one or more reactor tubes. The one or more reactor tubes are thus arranged to be heated by the heating fluid, where the heating fluid is arranged between said reactor tubes and said housing.

Convective bayonet reformers typically have a maximum reforming temperature of around 850° C. as it is confined by the temperature of the heating fluid. At the typical operating pressures, this means a relative high slip of methane. The current configuration allows to increase the reforming temperature by the electrical reformer, where the maximum energy utilization is extracted from the hot heating fluid (synthesis gas), and as such operated in a self-balanced scheme, while the electrical reformer is used as controlling device to lift the reforming temperature to achieve higher feedstock conversion. In this way minimum overall energy to a reforming section is achieved.

When using the convective bayonet reformer, it is an advantage that the reforming equilibrium temperature of the first synthesis gas is higher than the outlet temperature from the heat exchange reformer. This allows for maximum chemical energy in the first synthesis gas, while having a low temperature which is more easily applicable with the configuration of an electrically heated reformer because the electrically heated reformer in some configurations has temperature-sensitive parts which are more easily protected when the feed gas is colder.

The heat exchange reformer has an outlet for heating fluid.

In an embodiment, said heat exchange reformer comprises several reactor tubes placed inside of said housing. Said first catalyst beds are placed in said reactor tubes. Said hydrocarbon-containing feed is inlet to one end of said reactor tubes and outlet from the other. In an embodiment, the inlet is at the top of the reactor tubes. The hydrocarbon-containing feed is in this way heated and simultaneously converted into the first synthesis gas stream over the first catalyst beds. The energy input for said heating is provided from the heating fluid which flows from one end of said housing to the other. In an embodiment, the heating fluid flows from the bottom to the top of said housing.

In another embodiment, said heat exchange reformer comprises several reactor tubes placed inside of said housing which are bayonet tubes. The bayonet tubes comprise a central tube and an outer tube, thereby forming a void between the central and outer tube and the outer tube is only open in one end. Said first catalyst beds is placed in the void between the central tube and the outer tube. Said hydrocarbon-containing feed is inlet to the top of said reactor tubes outer tube and outlet from the top of the central tube. The hydrocarbon-containing feed is in this way heated and simultaneously converted into the first synthesis gas stream over the first catalyst beds. The energy input for said heating is provided partially from the heating fluid which flows from one end of said housing to the other, and partially from the hot first synthesis gas stream entering the bottom part of said central tube. In an embodiment, the heating fluid flows from the bottom to the top of said housing.

Another embodiment of said heat exchange reformer comprises several reactor tubes placed inside of said housing. Said first catalyst beds are placed in said housing surrounding said reactor tubes. Said hydrocarbon-containing feed is inlet to one end of housing and outlet from the other. In an embodiment, the inlet is at the top of the housing. The hydrocarbon-containing feed is in this way heated and simultaneously converted into the first synthesis gas stream over the first catalyst beds. The energy input for said heating is provided from the heating fluid which flows from one end of said reactor tubes to the other. In an embodiment, the heating fluid flows from the bottom to the top of said reactor tubes.

In a preferred embodiment of the invention, the heating fluid for the heat exchange reformer is synthesis gas. When using synthesis gas with CO as heating fluid, metal dusting needs to be considered. Here it is advantageously to have a relative high temperature of the synthesis gas, as this allows to control the temperature drop of the synthesis gas and thereby design how aggressive a potential for the Boudouard and/or CO reduction reaction there will be on the heat exchanging material inside of the heat exchange reformer. Consequently, it can be an advantage when the heating fluid comes from an e-SMR operating at a high temperature at a relative high S/C ratio. It is advantageous when an e-SMR is used in the reforming section over e.g. a tubular fired reformer, because the e-SMR can reach higher temperatures. Having a higher temperature from the e-SMR can be utilized to design the heat exchange reformer so the temperature of the heating fluid is kept higher inside the heat exchange reformer, than for e.g. a heating fluid from a tubular reformer. This can be utilized in the choice of metallic material for the heat exchange zone of the heat exchange reformer, which can be chosen as a cheaper lower alloy metal when the potential for metal dusting is lower. It is also an advantage when an e-SMR is used in the reforming section over e.g. an autothermal reformer, because the e-SMR has higher flexibility on which effective S/C ratio is used for operation, where the autothermal reformer needs to balance an increasing S/C ratio with an increasing oxygen addition. This means that when using the e-SMR in the reforming section it is possible to achieve a higher effective $H_2/CO$ ratio of the second synthesis gas stream than for e.g. an autothermal reformer.

Electrical Steam Methane Reformer (e-SMR)

The other primary component of the reforming section A is an electrical steam methane reformer, e-SMR.

Electrical steam methane reformers are known e.g. from Wismann et al, Science 2019: Vol. 364, Issue 6442, pp. 756-759, WO2019/228798, and WO2019/228795, the contents of which are incorporated by reference.

The e-SMR houses a second catalyst and is arranged to receive at least a portion of the first synthesis gas stream from the heat exchange reformer and convert it to a second synthesis gas stream. At least a part of this second synthesis gas stream (and preferably all of this second synthesis gas stream) is arranged to be provided to the heat exchange reformer as at least a part of said heating fluid (and preferably the entirety of said heating fluid). In this manner, a cooled second synthesis gas is obtained as product from the reforming section (A), while maintaining an effective use of the heat energy in the second synthesis gas stream.

Since the e-SMR is electrically heated, less overall energy consumption takes place compared to a fired steam methane reforming reactor, since a high temperature flue gas of the e-SMR is avoided. Moreover, if the electricity utilized for heating the electrically heated reforming reactor and possibly other units of the synthesis gas plant is provided from renewable energy resources, the overall consumption of hydrocarbons for the synthesis gas plant is minimized and $CO_2$ emissions accordingly reduced.

The e-SMR reactor is arranged to be heated by a first electricity flow. In an embodiment, the e-SMR comprises:

- a pressure shell housing an electrical heating unit arranged to heat the first catalyst, where the first catalyst comprises a catalytically active material operable to catalyzing steam reforming of the first part of the feed gas, wherein the pressure shell has a design pressure of between 5 and 50 bar,
- a heat insulation layer adjacent to at least part of the inside of the pressure shell, and—at least two conductors electrically connected to the electrical heating unit and to an electrical power supply placed outside the pressure shell,
- wherein the electrical power supply is dimensioned to heat at least part of the first catalyst by passing an electrical current through the electrical heating unit.

An important feature of the e-SMR is that the energy is supplied inside the reforming reactor, instead of being supplied from an external heat source via heat conduction, convection and radiation, e.g. through catalyst tubes. In an e-SMR with an electrical heating unit connected to an electrical power supply via conductors, the heat for the reforming reaction is provided by resistance heating. The hottest part of the e-SMR will be within the pressure shell of the electrically heated reforming reactor. Preferably, the electrical power supply and the electrical heating unit within the pressure shell are dimensioned so that at least part of the electrical heating unit reaches a temperature of 900° C., more preferably 1000° C. or even more preferably 1100° C.

In an embodiment, the e-SMR comprises a second catalyst as a bed of catalyst particles, e.g. pellets, typically in the form of catalytically active material supported on a high area support with electrically conductive structures embedded in the bed of catalyst particles. Alternatively, the catalyst may be catalytically active material supported on a macroscopic structure, such as a monolith.

When the e-SMR comprises a heat insulation layer adjacent to at least part of the inside of the pressure shell, appropriate heat and electrical insulation between the electrical heating unit and the pressure shell is obtained. Typically, the heat insulation layer will be present at the majority of the inside of the pressure shell to provide thermal insulation between the pressure shell and the electrical heating unit/first catalyst; however, passages in the heat insulation layers are needed in order to provide for connection of conductors between the electrical heating unit and the electrical power supply and to provide for inlets/outlets for gasses into/out of the electrically heated reforming reactor.

The presence of heat insulating layer between the pressure shell and the electrical heating unit assists in avoiding excessive heating of the pressure shell and assists in reducing thermal losses to the surroundings of the electrically heated reforming reactor. The temperatures of the electrical heating unit may reach up to about 1300° C., at least at some parts thereof, but by using the heat insulation layer between the electrical heating unit and the pressure shell, the temperature of the pressure shell can be kept at significantly lower temperatures of e.g. 500° C. or even 200° C. This is advantageous since typical construction steel materials are unsuitable for pressure bearing applications at high temperatures, such as above 1000° C. Moreover, a heat insulating layer between the pressure shell and the electrical heating unit assists in control of the electrical current within the e-SMR, since heat insulation layer is also electrically insulating. The heat insulation layer could be one or more layers of solid material, such as ceramics, inert material, refractory material or a gas barrier or a combination thereof. Thus, it is also conceivable that a purge gas or a confined gas constitutes or forms part of the heat insulation layer.

As the hottest part of the e-SMR during operation is the electrical heating unit, which will be surrounded by heat insulation layer, the temperature of the pressure shell can be kept significantly lower than the maximum process temperature. This allows for having a relative low design temperature of the pressure shell of e.g. 700° C. or 500° C. or preferably 300° C. or 200° C. of the pressure shell whilst having maximum process temperatures of 900° C. or even 1100° C. or even up to 1300° C.

Another advantage is that the lower design temperature compared to a fired SMR means that in some cases the thickness of the pressure shell can be decreased, thereby saving costs.

It should be noted that the term "heat insulating material" is meant to denote materials having a thermal conductivity of about 10 $W \cdot m^{-1} \cdot K^{-1}$ or below. Examples of heat insulating materials are ceramics, refractory material, alumina-based materials, zirconia-based materials and similar.

In an embodiment, the synthesis gas plant further comprises a control system arranged to control the electrical power supply to ensure that the temperature of the gas exiting the electrically heated reforming reactor lies in a predetermined range and/or to ensure that the conversion of hydrocarbons in the first part of the feed gas lies in a predetermined range and/or to ensure the dry mole concentration of methane lies in a predetermined range and/or to ensure the approach to equilibrium of the steam reforming reaction lies in a predetermined range. Typically, the maximum temperature of the gas lies between 900° C. and 1000° C., such as at about 950° C., but even higher temperatures are conceivable, e.g. up to 1300° C. The maximum temperature of the gas will be achieved close to the most downstream part of the first catalyst as seen in the flow direction of the feed gas.

In an embodiment, the synthesis gas plant further comprises a control system, which as a sole product quality control mechanism is arranged to control the electrical power supply to ensure that the temperature of the gas exiting the electrically heated reforming reactor lies in a predetermined range. Thus, in this embodiment the product quality is controlled by feedback control on the e-SMR alone, i.e. no control of e.g. the heat exchange reformer is carried out. In one embodiment, the control system is not arranged to provide feedback control on the outlet temperature of said heat exchange reformer.

The control of the electrical power supply is the control of the electrical output from the power supply. The control of the electrical power supply may e.g. be carried out as a control of the voltage and/or current from the electrical power supply, as a control of whether the electrical power supply is turned on or off or as a combination hereof. The power supplied to the electrically heated reforming reactor can be in the form of alternating current or direct current.

Process control on the electrically heated SMR (e-SMR) gives a direct control feed-back loop on the operation, where a control change of the operating conditions is carried out by increasing or decreasing the electricity input to the reactor from an associated power supply unit. Such a power supply unit can be configured in different ways depending on the circumstances, where the most common configurations are a thyristor controller and an autotransformer. Irrespective of the chosen technology, the power supply unit can be configured to allow very fast changes (less than seconds of response time) and very precise control. This means that an immediate feedback can be built around the e-SMR such that a given exit temperature from the reactor can be obtained by coupling the exit temperature to a control scheme, which actuates on the supplied electricity from the power supply unit. As a result, a very precise operating temperature in the e-SMR can be achieved. As the operating temperature is a key parameter for controlling the conversion of the endothermic steam methane reforming reaction, this translates directly into having a very stable and precisely defined product gas composition.

Due to the advantages and fast response of the control mechanism of the e-SMR reactor it is an advantage to direct control of a chemical plant towards the e-SMR reactor. In the present invention this is specifically utilized by combining the e-SMR reactor with a convective (heat exchange) reformer. A typical convective reformer has a very slow control scheme to achieve a given outlet temperature and e.g. associated product quality, because this control mechanism involves first receiving a hot heating gas with an adjusted temperature, which will then transfer an adjusted amount of heat to the catalyst zone of the convective reformer. This transfer of heat to the catalyst zone has a relative slow response to changes, because a steady state needs to establish over the heat transfer mechanism across a tube wall, which means that some time (from minutes up to an hour) is needed to see the full response in a control action on the product quality. Additionally, when the convective reformer is placed upstream and in series with another reformer where the second reformer provides the hot heating gas for the convective reformer, the product gas from the convective reformer influence the operation of the downstream reformer, which will need to change its operation intensity based on the operation of the convective reformer. If this downstream reformer is a fired reformer the overall control mechanism will involve a fuel mix system, where both the amount of fuel and the amount of oxidant air must be controlled to control the operation of the fired reformer. If instead, as in the present invention, the downstream reformer is an e-SMR the transient nature of the temperature and degree of conversion in the convective reformer can easily be compensated by the downstream e-SMR, where the faster electrical feedback control compensates for any transients in the upstream reformer, and consequently the combined operation of the convective reformer and the e-SMR provides a stable production of product irrespective of the transients in the operation of the convective reformer. This also means that the configuration of the present invention will achieve an intended steady state production faster than e.g. a similar configuration where the e-SMR is replaced with a more traditional fired reformer.

In an embodiment, the electrical heating unit comprises a macroscopic structure of electrically conductive material, where the macroscopic structure supports a ceramic coating and the ceramic coating supports a catalytically active material. Thus, during operating of the synthesis gas plant, an electrical current is passed through the macroscopic structure and thereby heats the macroscopic structure and the catalytically active material supported thereon. The close proximity between the catalytically active material and the macroscopic structure enables efficient heating of the catalytically active material by solid material heat conduction from the resistance heated macroscopic structure. The amount and composition of the catalytically active material can be tailored to the steam reforming reaction at the given operating conditions. The surface area of the macroscopic structure, the fraction of the macroscopic structure coated with a ceramic coating, the type and structure of the ceramic coating, and the amount and composition of the catalytically active material may be tailored to the steam reforming reaction at the given operating conditions.

The term "electrically conductive" is meant to denote materials with an electrical resistivity in the range from: $10^{-4}$ to $10^{-8}$ Ω·m at 20° C. Thus, materials that are electrically conductive are e.g. metals like copper, silver, aluminum, chromium, iron, nickel, or alloys of metals. Moreover, the term "electrically insulating" is meant to denote materials with an electrical resistivity above 10 Ω·m at 20° C., e.g. in the range from $10^{9}$ to $10^{25}$ Ω·m at 20° C.

As used herein, the term "electrical heating unit comprises a macroscopic catalyst" is not meant to be limited to a reforming reactor with a single macroscopic structure. Instead, the term is meant to cover both a macroscopic structure with ceramic coating and catalytically active material as well as an array of such macroscopic structures with ceramic coating and catalytically active material.

The term "macroscopic structure supporting a ceramic coating" is meant to denote that the macroscopic structure is coated by the ceramic coating at, at least, a part of the surface of the macroscopic structure. Thus, the term does not imply that all the surface of the macroscopic structure is coated by the ceramic coating; in particular, at least the parts of the macroscopic structure which are electrically connected to the conductors and thus to the electrical power supply do not have a coating thereon. The coating is a ceramic material with pores in the structure which allows for supporting catalytically active material on and inside the coating and has the same function as a catalytic support. Advantageously, the catalytically active material comprises catalytically active particles having a size in the range from about 5 nm to about 250 nm.

As used herein, the term "macroscopic structure" is meant to denote a structure which is large enough to be visible with the naked eye, without magnifying devices. The dimensions of the macroscopic structure are typically in the range of centimeters or even meters. Dimensions of the macroscopic structure are advantageously made to correspond at least partly to the inner dimensions of the pressure shell, saving room for the heat insulation layer and conductors.

A ceramic coating, with or without catalytically active material, may be added directly to a metal surface by wash coating. The wash coating of a metal surface is a well-known process; a description is given in e.g. Cybulski, A., and Moulijn, J. A., Structured catalysts and reactors, Marcel Dekker, Inc, New York, 1998, Chapter 3, and references herein. The ceramic coating may be added to the surface of the macroscopic structure and subsequently the catalytically active material may be added; alternatively, the ceramic coat comprising the catalytically active material is added to the macroscopic structure.

Preferably, the macroscopic structure has been manufactured by extrusion of a mixture of powdered metallic particles and a binder to an extruded structure and subsequent sintering of the extruded structure, thereby providing a material with a high geometric surface area per volume. A ceramic coating, which may contain the catalytically active material, is provided onto the macroscopic structure before a second sintering in an oxidizing atmosphere, in order to form chemical bonds between the ceramic coating and the macroscopic structure. Alternatively, the catalytically active material may be impregnated onto the ceramic coating after the second sintering. When chemical bonds are formed between the ceramic coating and the macroscopic structure, an especially high heat conductivity between the electrically heated macroscopic structure and the catalytically active material supported by the ceramic coating is possible, offering close and nearly direct contact between the heat source and the catalytically active material of the macroscopic structure. Due to close proximity between the heat source and the catalytically active material, the heat transfer is effective, so that the macroscopic structure can be very efficiently heated. A compact reforming reactor in terms of gas processing per reforming reactor volume is thus possible, and therefore the reforming reactor housing the macroscopic structure may be compact. The reforming reactor of the invention does not need a furnace, and this reduces the size of the electrically heated reforming reactor considerably.

Preferably, the macroscopic structure comprises Fe, Ni, Cu, Co, Cr, Al, Si or an alloy thereof. Such an alloy may comprise further elements, such as Mn, Y, Zr, C, Co, Mo or combinations thereof. Preferably, the catalytically active material is particles having a size from 5 nm to 250 nm. The catalytically active material may e.g. comprise nickel, ruthenium, rhodium, iridium, platinum, cobalt, or a combination thereof. Thus, one possible catalytically active material is a combination of nickel and rhodium and another combination of nickel and iridium.

The ceramic coating may for example be an oxide comprising Al, Zr, Mg, Ce and/or Ca. Exemplary coatings are calcium aluminate or a magnesium aluminum spinel. Such a ceramic coating may comprise further elements, such as La, Y, Ti, K, or combinations thereof.

Preferably, the conductors are made of different materials than the macroscopic structure. The conductors may for example be of iron, nickel, aluminum, copper, silver, or an alloy thereof. The ceramic coating is an electrically insulating material and will typically have a thickness in the range of around 100 μm, say 10-500 μm. In addition, a catalyst may be placed within the pressure shell and in channels within the macroscopic structure, around the macroscopic structure or upstream and/or downstream the macroscopic structure to support the catalytic function of the macroscopic structure.

The "catalysts" mentioned herein (e.g. the first and second catalysts) are catalysts suitable for the steam reforming reaction, the prereforming reaction, methanation and/or the water gas shift reaction. Examples of relevant such catalyst are $Ni/MgAl_2O_4$, $Ni/CaAl_2O_4$, $Ni/Al_2O_3$, $Fe_2O_3/Cr_2O_3/MgO$, and $Cu/Zn/Al_2O_3$. Examples of steam reforming catalysts are $Ni/MgAl_2O_4$, $Ni/Al_2O_3$, $Ni/CaAl_2O_4$, $Ni/ZrO_2$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier. Other catalysts suitable for reforming are also conceivable.

In one aspect, the e-SMR is arranged to receive a second portion of the hydrocarbon-containing feed. This allows for increasing the overall product gas production, which can be done without significantly changing on the operation of the heat exchange reformer.

In an embodiment, the concept involves a reforming section and a gas separation section (preferably PSA or methanol synthesis), where the reforming section includes a fired convective reformer running with the separation section off-gas as only fuel source, while the eSMR controls the resulting reforming temperature to stabilize production.

In an embodiment, the plant further comprises a gas purification unit and/or a prereforming unit upstream the reforming section (A). The gas purification unit may be e.g. a desulfurization unit, such as a hydrodesulfurization unit.

In the prereformer, the hydrocarbon gas will, together with steam, and potentially also hydrogen and/or other components such as carbon dioxide, undergo prereforming (according to reaction (iv) above) in a temperature range of ca. 350-550° C. to convert higher hydrocarbons as an initial step in the process. Prereforming usually takes place downstream any desulfurization step. This removes the risk of carbon formation from higher hydrocar-ons on catalyst in the subsequent process steps. Optionally, carbon dioxide or other components may also be mixed with the gas leaving the prereforming step to form the "hydrocarbon-containing feed" for the reforming section (A).

Gas Separation Section (B)

The gas separation section (B) is arranged to receive a synthesis gas stream from said reforming section (A) and separate it into at least a condensate and a product gas.

The synthesis gas stream provided to the gas separation section (B) from the reforming section (A) is typically the second synthesis gas stream from the e-SMR. Alternatively, the synthesis gas stream provided to the gas separation section (B) from the reforming section (A) may be a mixture of first and second synthesis gas streams. If post-processing is included, the synthesis gas stream provided to the gas separation section (B) from the reforming section (A) may be the post processed synthesis gas stream.

The gas separation section (B) comprises one or more of the following units: a flash separation unit, a $CO_2$ removal unit, a pressure swing adsorption unit (PSA unit), a membrane, and/or a cryogenic separation unit.

By flash separation is meant a phase separation unit, where a stream is divided into a liquid and gas phase close to or at the thermodynamic phase equilibrium at a given temperature.

By $CO_2$ removal is meant a unit utilizing a process, such as chemical absorption, for removing $CO_2$ from the process gas. In chemical absorption, the $CO_2$ containing gas is passed over a solvent which reacts with $CO_2$ and in this way binds it. The majority of the chemical solvents are amines, classified as primary amines as monoethanolamine (MEA) and digylcolamine (DGA), secondary amines as diethanolamine (DEA) and diisopropanolamine (DIPA), or tertiary amines as triethanolamine (TEA) and methyldiethanolamine (MDEA), but also ammonia and liquid alkali carbonates as $K_2CO_3$ and $NaCO_3$ can be used.

By swing adsorption, a unit for adsorbing selected compounds is meant. In this type of equipment, a dynamic equilibrium between adsorption and desorption of gas molecules over an adsorption material is established. The adsorption of the gas molecules can be caused by steric, kinetic, or equilibrium effects. The exact mechanism will be determined by the used adsorbent and the equilibrium saturation will be dependent on temperature and pressure. Typically, the adsorbent material is treated in the mixed gas until near saturation of the heaviest compounds and will subsequently need regeneration. The regeneration can be done by changing pressure or temperature. In practice, this means that a process with at least two units is used, saturating the adsorbent at high pressure or low temperature initially in one unit, and then switching unit, now desorbing the adsorbed molecules from the same unit by decreasing the pressure or increasing the temperature. When the unit operates with changing pressures, it is called a pressure swing adsorption unit, and when the unit operates with changing temperature, it is called a temperature swing adsorption unit. Pressure swing adsorption can generate a hydrogen purity of 99.9% or above.

By membrane is meant separation over an at least partly solid barrier, such as a polymer, where the transport of individual gas species takes place at different rates defined by their permeability. This allows for up-concentration, or dilution, of a component in the retentate of the membrane.

By cryogenic separation is meant a process utilizing the phase change of different species in the gas to separate individual components from a gas mixture by controlling the temperature, typically taking place below −150° C.

In a specific embodiment, the gas separation unit comprises a flash separation unit in series with a pressure swing adsorption unit. A condensate comprising mostly water is thereby firstly separated in the flash separation unit, and then a hydrogen product is purified in the pressure swing adsorption unit. The pressure swing adsorption unit will in this embodiment also produce an off-gas comprising $CO_2$, CO, $CH_4$, and $H_2$.

In another specific embodiment, the gas separation unit has a flash separation unit in series with a carbon removal unit, in series with a CO cold box. A condensate comprising mostly water is thereby firstly separated in the flash separation unit, and then CO2 is removed in the CO2 removal unit. Finally, the product gas is separated into a product gas of substantially pure CO, a product gas of substantially pure $H_2$, and an off-gas. The off-gas will in this case comprise CO, $CH_4$, and $H_2$.

By the configuration of the synthesis gas plant, maximum utilization of all streams is achieved by returning the fuel rich off-gases generated from different embodiments of gas separation units to the one or more burners of the heat exchange reformer.

In an aspect, gas separation section (B) is arranged to also provide an off-gas. In a preferred aspect, at least part of the off-gas from the gas separation section (B) is arranged to be provided as fuel for said one or more burners of the heat exchange reformer. Even more preferably the off-gas from the gas separation section (B) is arranged to be provided as the only fuel for said one or more burners of the heat exchange reformer.

The configuration of the presented layouts allows for utilizing waste energy in a chemical process efficiently, while still operating the process at set conditions.

In one embodiment, separation section (B) comprises a hydrogen purification section, wherein said hydrogen separation section is arranged to receive a synthesis gas stream from said reforming section (A) and provide product gas being a hydrogen-rich stream, and an off-gas, being an off-gas stream from the hydrogen separation section.

In another embodiment, separation section (B) comprises a flash separation unit and a pressure swing adsorption (PSA) unit, wherein said flash separation unit is arranged to receive a synthesis gas stream from said reforming section (A) and separate it into at least a condensate and a third synthesis gas stream, and wherein said PSA unit is arranged to receive said third synthesis gas stream from said flash separation unit and provide a product gas and an off-gas.

In another embodiment, separation section (B) comprises a methanol synthesis section, wherein said methanol synthesis section is arranged to receive a synthesis gas stream from said reforming section (A) and provide product gas being a methanol-rich stream, and an off-gas being an off-gas stream from the methanol synthesis section.

In another embodiment, separation section (B) comprises a CO cold box, wherein said CO cold box is arranged to receive a synthesis gas stream from said reforming section (A) and provide product gas being a substantially pure CO stream, a second product stream, being a substantially pure $H_2$ stream, and an off-gas being an off-gas stream from the CO cold box.

In another embodiment, separation section (B) comprises an ammonia loop, wherein said ammonia loop is arranged to receive a synthesis gas stream from said reforming section (A) and provide product gas being a substantially pure ammonia stream, and an off-gas being an off-gas stream from the ammonia loop.

In another embodiment, separation section (B) comprises a Fischer-Tropsch section, wherein said Fischer-Tropsch section is arranged to receive a synthesis gas stream from said reforming section (A) and provide product gas being a stream of higher hydrocarbons, and an off-gas stream from the Fischer-Tropsch section.

In another embodiment, separation section (B) comprises a flash separation unit and a hydrogen separation section, wherein said flash separation unit is arranged to receive a synthesis gas stream from said reforming section (A) and separate it into at least a condensate and a third synthesis gas stream, and wherein said hydrogen separation section is arranged to receive said third synthesis gas stream from said flash separation unit and provide a product gas being a hydrogen-rich stream and an off-gas being an off-gas stream from the hydrogen separation section.

A post processing unit may be arranged between the reforming section (A) and the gas separation section (B), said post processing unit being arranged to receive the second synthesis gas stream from the e-SMR and provide a post processed synthesis gas stream, and wherein the gas separation section (B) is arranged to receive the post processed synthesis gas stream and separate it into at least a condensate, a product gas and an off-gas.

In an embodiment, the post processing unit is a water gas shift reactor.

Process

Also provided is a process for providing a product gas from a hydrocarbon-containing feed in a plant according to the invention, said process comprising the steps of:

a. providing a plant as described herein,
b. converting a first portion of the hydrocarbon-containing feed to a first synthesis gas stream in said heat exchange reformer,
c. converting at least a portion of the first synthesis gas stream from said heat exchange reformer to a second synthesis gas stream in said e-SMR,
d. controlling the product quality by feedback control on the e-SMR to ensure that the temperature of the gas exiting the e-SMR lies in a predetermined range,
e. supplying at least a part of the second synthesis gas stream (21) to the heat exchange reformer (10) as at least a part of said heating fluid (19), and;
f. supplying a synthesis gas stream from said reforming section (A) to said gas separation section (B) and separating it into at least a condensate and a product gas.

In an embodiment, the product quality is controlled solely by feedback control on the e-SMR to ensure that the temperature of the gas exiting the e-SMR lies in a predetermined range.

For stable production of said product gas, the heat exchange reformer may be operated without feedback control on the outlet temperature of said heat exchange reformer. "Stable production" is used to mean that the plant is in steady state.

In one aspect of the process defined herein, product quality (as defined above, and—in particular the product quality from the reforming section) is controlled by feedback control on the e-SMR alone.

Suitably, the flow rate of the first hydrocarbon-containing stream has a substantially constant set point value. By constant set point value is understood that the flow of feed is roughly constant, only varying as a consequence of process control equipment regulation mechanisms and electronics.

Advantages of the process and embodiments thereof correspond to the advantages of the plant and embodiments thereof and will therefore not be described in further detail here.

SPECIFIC EMBODIMENTS

Figure 2:
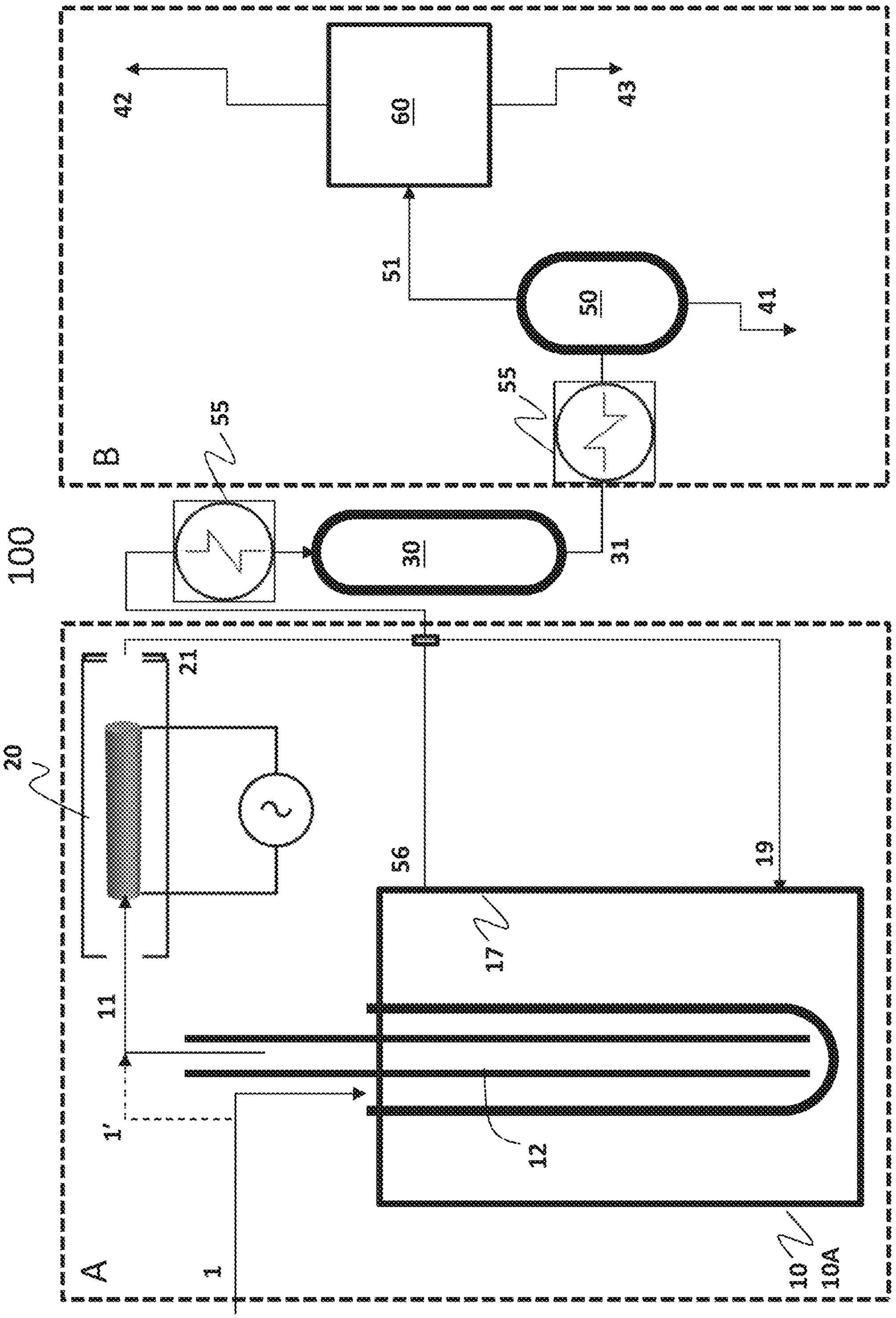
FIG. 2 shows a schematic plant layout, including an e-SMR

FIG. 2 shows a plant 100 according to the invention comprising a reforming section (A), a gas separation section (B) and a hydrocarbon-containing feed 1. Reforming section (A) is arranged to receive the hydrocarbon-containing feed 1 and provide a synthesis gas stream 11. The reforming section (A) comprises a heat exchange reformer 10—in this case a heat exchange bayonet reformer 10A—and an electrical steam methane reformer, e-SMR 20, arranged downstream of said heat exchange reformer 10.

The heat exchange reformer 10 comprises a housing 17 and one or more reactor tubes 12 arranged within said housing 17. Only one reactor tube 12 is shown in FIG. 1, which specifically is a bayonet reactor tube. Heating for the heat exchange reformer 10 is provided by a heating fluid 19, which is cooled inside the heat exchange reformer to a cooled heating fluid 56.

One or more first catalyst bed(s) are arranged inside said heat exchange reformer. The catalyst bed(s) are arranged to be heated by a heating fluid 19, whereby said one or more first catalyst bed(s) are arranged to receive a first portion of the hydrocarbon-containing feed 1 and convert said first portion of the hydrocarbon-containing feed 1 to a first synthesis gas stream 11.

The e-SMR 20 housing a second catalyst is arranged to receive at least a portion of the first synthesis gas stream 11 from the heat exchange reformer 10 and convert it to a second synthesis gas stream 21. This is used as heating fluid (19) for the heat exchange reformer (10), thereby providing a cooled second synthesis gas (56) as product from the reforming section (A).

The gas separation section (B) is arranged to receive a synthesis gas stream from said reforming section (A) and separate it into at least a condensate 41 and a product gas 42.

FIG. 2 shows a post processing unit 30 arranged between the reforming section (A) and the gas separation section (B). The post processing unit 30 is arranged to receive the (cooled) second synthesis gas stream (21/56) from the e-SMR 20 and provide a post processed synthesis gas stream 31, as shown. In an embodiment, this post processing unit 30 is a water gas shift reactor. The gas separation section (B) is arranged to receive the post processed synthesis gas stream 31 and separate it into at least a condensate 41, a product gas 42 and an off-gas 43.

Also in FIG. 2, the off-gas 43 from the gas separation section (B) is arranged to be provided as fuel for said one or more burners of the heat exchange reformer 10. FIG. 2 shows the optional feature that the e-SMR 20 is arranged to receive a second portion 1' of the hydrocarbon-containing feed together with the first synthesis gas stream 11.

In the plant of FIG. 2, separation section (B) comprises a flash separation unit 50 and a pressure swing adsorption (PSA) unit 60. The flash separation unit 50 is arranged to receive a synthesis gas stream from the reforming section (A) and separate it into at least a condensate 41 and a third synthesis gas stream 51. The PSA unit 60 is arranged to receive the third synthesis gas stream 51 from the flash separation unit 50 and provide a product gas 42 and an off-gas 43.

Other components of the plant 100 in FIG. 2 are:

heat exchangers 55 outlet 56 from heat exchange reformer 10

FIG. 1 shows a plant analogous to that of FIG. 2. However, the plant of FIG. 1 is not according to the invention, as it does not comprise an e-SMR.

Example 1

Table 1 and Table 2 summarize an embodiment of the invention. In this case a convective bayonet heat exchange reformer is placed in series with an e-SMR, a WGS reactor, a flash separation unit, and a PSA. The hydrocarbon-containing feed is fed to the bayonet heat exchange reformer and reformed to a maximum temperature of 681° C. in the bottom of the reactor tubes (12). At this point the gas enters the bayonet of the reactor tubes (12) and heat exchanges with the catalyst bed in the reactor tubes (12), effectively reducing the temperature of the first synthesis gas stream to 597° C. before leaving the heat exchange reformer (10). The effluent is transferred directly to an e-SMR, where the temperature is elevated to 1050° C. to achieve even further conversion of methane in the feed, as the methane mole fraction decreases from 21.1 outlet the heat exchange reformer (10) to 0.5 outlet the e-SMR. This requires an electricity input of 27.8 Gcal/h to the e-SMR. The second synthesis gas is cooled as it is used as heating fluid in the heat exchange reformer (10), giving an effluent temperature of 681° C. Effectively, 7.24 Gcal/h is transferred from the second synthesis gas to the heat exchange reformer in this convective step. Note that all of the second synthesis gas is used as heating fluid and no efforts are done to reach a specific outlet temperature from the heat exchange reformer, because the system can be fully controlled by means of the control of the e-SMR. The cooled second synthesis gas is cooled further and then shifted towards a more $H_2$ rich product in a downstream WGS reactor. It is then cooled further to allow condensation of water in the stream. Finally, the stream is separated to a product gas of hydrogen in a PSA. The hydrogen product is in the given embodiment 30707 $Nm^3/h$.

TABLE 1

| To Operation | (1) to reformer (10) | (11) to bayonet inlet | Inlet (20) | Outlet (20) and heating fluid to (10) | Cooled heating fluid from (10) | Inlet WGS | Outlet WGS |
|---|---|---|---|---|---|---|---|
| Temperature [° C.] | 413 | 641 | 597 | 1050 | 681 | 330 | 442 |
| Pressure [kg/cm$^2$ g] | 26.0 | 24.7 | 24.5 | 24.4 | 24.1 | 23.8 | 23.3 |
| Total Flow [Nm$^3$/h] | 33683 | 37487 | 37487 | 52707 | 52707 | 52707 | 52707 |
| Composition [mole %] | | | | | | | |
| Carbon Dioxide | 8.5 | 10.4 | 10.4 | 3.9 | 3.9 | 3.9 | 13.6 |
| Nitrogen | 0.3 | 0.3 | 0.3 | 0.2 | 0.2 | 0.2 | 0.2 |
| Methane | 29.1 | 21.1 | 21.1 | 0.5 | 0.5 | 0.5 | 0.5 |
| Hydrogen | 3.8 | 21.4 | 21.4 | 55.0 | 55.0 | 55.0 | 64.7 |
| Carbon Monoxide | 0.1 | 2.4 | 2.4 | 19.6 | 19.6 | 19.6 | 10.0 |
| Water | 58.2 | 44.5 | 44.5 | 20.7 | 20.7 | 20.7 | 11.0 |

TABLE 2

| | Inlet flash (50) | Inlet PSA (60) | Product (42) |
|---|---|---|---|
| To Operation | | | |
| Temperature [° C.] | 40 | 40 | 40 |
| Pressure [kg/cm$^2$ g] | 23.0 | 23.0 | 23.0 |
| Total Flow [Nm$^3$/h] | 52707 | 47033 | 30707 |

TABLE 2-continued

| | Inlet flash (50) | Inlet PSA (60) | Product (42) |
|---|---|---|---|
| Composition [mole %] | | | |
| Carbon Dioxide | 13.6 | 15.2 | 0.0 |
| Nitrogen | 0.2 | 0.2 | 0.0 |
| Methane | 0.5 | 0.6 | 0.0 |
| Hydrogen | 64.7 | 72.5 | 100.0 |
| Carbon Monoxide | 10.0 | 11.2 | 0.0 |
| Water | 11.0 | 0.3 | 0.0 |

Example 2

Table 3 summarize a comparative example to Example 1. In this case an e-SMR is placed in series with a WGS reactor, a flash separation unit, and a PSA. The hydrocarbon-containing feed is fed to an e-SMR, where the temperature is elevated to 1050° C. to achieve conversion of methane in the feed. This requires an electricity input of 35.0 Gcal/h to the e-SMR. The second synthesis gas is cooled and then shifted towards a more $H_2$ rich product in a downstream WGS reactor. It is then cooled further to allow condensation of water in the stream. Finally, the stream is separated to a product gas of hydrogen in a PSA. The hydrogen product is in the given embodiment 30328 $Nm^3/h$.

Notice that Example 1 and 2 uses the exact same amount of hydrocarbon-containing feed (1), but by utilizing the heat exchange reformer upstream the e-SMR the electricity input to the e-SMR is decreased by 26%; from 35.0 Gcal/h in Example 2 without the heat exchange reformer, to 27.8 Gcal/h in Example 1 with a heat exchange reformer.

TABLE 3

| To Operation | (1) to e-SMR (20) | Outlet (20) | Inlet WGS | Outlet WGS | Inlet flash (50) | Inlet PSA (60) | Product (42) |
|---|---|---|---|---|---|---|---|
| Temperature [° C.] | 413 | 1050 | 330 | 442 | 40 | 40 | 40 |
| Pressure [kg/cm$^2$ g] | 26.0 | 25.9 | 25.3 | 24.8 | 24.5 | 24.5 | 24.5 |
| Total Flow [Nm$^3$/h] | 33683 | 52647 | 52647 | 52647 | 52647 | 46937 | 30628 |
| Composition [mole %] | | | | | | | |
| Carbon Dioxide | 8.5 | 3.9 | 3.9 | 13.6 | 13.6 | 15.2 | 0.0 |
| Nitrogen | 0.3 | 0.2 | 0.2 | 0.2 | 0.2 | 0.2 | 0.0 |
| Methane | 29.1 | 0.6 | 0.6 | 0.6 | 0.6 | 0.7 | 0.0 |
| Hydrogen | 3.8 | 54.9 | 54.9 | 64.6 | 64.6 | 72.5 | 100.0 |
| Carbon Monoxide | 0.1 | 19.6 | 19.6 | 9.9 | 9.9 | 11.1 | 0.0 |
| Water | 58.2 | 20.8 | 20.8 | 11.1 | 11.1 | 0.3 | 0.0 |

The invention claimed is:

1. A process for providing a product gas from a hydrocarbon-containing feed in a plant, said process comprising the step of:

a. providing the plant, the plant comprising a reforming section, a gas separation section and the hydrocarbon-containing feed, wherein said reforming section is arranged to receive said hydrocarbon-containing feed and provide a synthesis gas stream, wherein said reforming section comprises a heat exchange reformer and an electrical steam methane reformer (e-SMR) arranged downstream of said heat exchange reformer, said heat exchange reformer comprising a housing and one or more reactor tubes arranged within said housing, wherein one or more first catalyst bed(s) are arranged inside said heat exchange reformer with a transient temperature and degree of conversion, said catalyst bed(s) being arranged to be heated by a heating fluid, wherein said one or more first catalyst bed(s) are arranged to receive a first portion of the hydrocarbon-containing feed and convert said first portion of the hydrocarbon-containing feed to a first synthesis gas stream, said e-SMR housing a second catalyst, wherein the plant comprises a control system arranged to control the electrical power supply to ensure that the temperature of the gas exiting the e-SMR lies in a predetermined range, wherein the control system is not arranged to provide feedback control on the outlet temperature of said heat exchange reformer, said process further comprising the steps of:

b. converting the first portion of the hydrocarbon-containing feed to the first synthesis gas stream in said one or more first catalyst bed(s) arranged inside said heat exchange reformer, c. converting at least a portion of the first synthesis gas stream from said heat exchange reformer to a second synthesis gas stream in said e-SMR, d. controlling, by the control system, the product quality by feedback control on the e-SMR to control a conversion of an endothermic steam methane forming reaction to ensure that the temperature of the gas exiting the e-SMR lies in the predetermined range with a process temperature of at least 900° C.

e. supplying at least a part of the second synthesis gas stream to the heat exchange reformer as at least a part of said heating fluid, and f. supplying a synthesis gas stream from said reforming section to said gas separation section and separating it into at least a condensate and a product gas.

2. The process according to claim 1, wherein said one or more first catalyst bed(s) are arranged inside said one or more reactor tubes, said one or more reactor tubes being arranged to be heated by said heating fluid, said heating fluid being arranged between said reactor tubes and said housing.

3. The process according to claim 1, wherein the heat exchange reformer is a heat exchange bayonet reformer.

4. The process according to claim 1, wherein the e-SMR receives a second portion of the hydrocarbon-containing feed together with the first synthesis gas stream.

5. The process according to claim 1, wherein a post processing unit is arranged between the reforming section and the gas separation section, said post processing unit receiving the second synthesis gas stream from the e-SMR, after being supplied to the heat exchange reformer as heating fluid, and providing a post processed synthesis gas stream, and wherein the gas separation section receives the post processed synthesis gas stream and separates it into at least a condensate, a product gas and an off-gas.

6. The process according to claim 1, wherein the synthesis gas stream from said reforming section is selected from the group consisting of the second synthesis gas stream, a mixture of the first and second synthesis gas streams and a post processed synthesis gas stream.

7. The process according to claim 1, wherein the gas separation section comprises a hydrogen separation section, wherein said hydrogen separation section receives said synthesis gas stream from said reforming section and provides a product gas being a hydrogen-rich stream, and an off-gas, being an off-gas stream from the hydrogen separation section.

8. The process according to claim 1, wherein the gas separation section comprises a flash separation unit and a pressure swing adsorption (PSA) unit, wherein said flash separation unit receives said synthesis gas stream from said reforming section and separates it into at least a condensate and a third synthesis gas stream, and wherein said PSA unit receives said third synthesis gas stream from said flash separation unit and provides a product gas and an off-gas.

9. The process according to claim 1, wherein said separation section comprises a methanol synthesis section, a CO cold box, an ammonia loop, or a Fischer-Tropsch section.

* * * * *